(12) United States Patent
Zuo et al.

(10) Patent No.: US 8,941,251 B2
(45) Date of Patent: Jan. 27, 2015

(54) ELECTRICITY GENERATING SHOCK ABSORBERS

(75) Inventors: Lei Zuo, Nesconset, NY (US); Xiudong Tang, Stony Brook, NY (US); Pei Sheng Zhang, Bayside, NY (US)

(73) Assignee: The Research Foundation of State University of New York, Albany, NY (US)

( * ) Notice: Subject to any disclaimer, the term of this patent is extended or adjusted under 35 U.S.C. 154(b) by 0 days.

(21) Appl. No.: 13/812,959

(22) PCT Filed: Feb. 14, 2011

(86) PCT No.: PCT/US2011/024699
§ 371 (c)(1),
(2), (4) Date: Jan. 29, 2013

(87) PCT Pub. No.: WO2012/015488
PCT Pub. Date: Feb. 2, 2012

(65) Prior Publication Data
US 2013/0127175 A1 May 23, 2013

Related U.S. Application Data

(60) Provisional application No. 61/368,846, filed on Jul. 29, 2010.

(51) Int. Cl.
*H02K 41/00* (2006.01)
*H02K 41/02* (2006.01)
(Continued)

(52) U.S. Cl.
CPC .............. *H02K 41/02* (2013.01); *B60G 17/06* (2013.01); *F16F 15/03* (2013.01); *B60G 2300/60* (2013.01)
USPC .......................................... 290/1 R (58) Field of Classification Search
CPC ....................................... H02K 41/00
USPC ........................................ 290/1 R
See application file for complete search history.

(56) References Cited

U.S. PATENT DOCUMENTS 1,557,570 A * 10/1925 Eckman et al. ............ 180/65.31
2,845,503 A * 7/1958 Durand ..................... 200/52 R
(Continued)

FOREIGN PATENT DOCUMENTS

CN 101567613 A * 10/2009
GB 2465423 A * 5/2010
(Continued)

OTHER PUBLICATIONS

International Search Report dated Oct. 27, 2011 issued in PCT/US2011/024699.

*Primary Examiner* — Joseph Waks
(74) *Attorney, Agent, or Firm* — Scully, Scott, Murphy & Presser, P.C.

(57) ABSTRACT

An electricity generating shock absorber includes a coil assembly having a length of electrically conducting material wrapped around an outside perimeter, and along a length, of a hollow tube formed of electrically resistant material; a magnet unit formed of at least one annular axial magnet; a central shaft having a magnetic reluctance on which a plurality of the magnet units are mounted, the central shaft dimensioned for insertion through a central opening of the at least one annular axial magnet, the central shaft combined with the plurality of magnet units forming a magnet assembly dimensioned to slideably insert into a central cavity of the hollow tube; and a cylindrical shell having a first end attached to a terminal end of the magnet assembly, the cylindrical shell extending a length of the magnet assembly, the cylindrical shell having an inner diameter sized to slideably accommodate an outside diameter of the coil assembly.

22 Claims, 5 Drawing Sheets

(51) Int. Cl.
*B60G 17/06* (2006.01)
*F16F 15/03* (2006.01)

(56) References Cited

U.S. PATENT DOCUMENTS

| | | | | |
|---|---|---|---|---|
| 3,559,027 | A * | 1/1971 | Arsem | 22/3 |
| 3,861,487 | A * | 1/1975 | Gill | 180/65.31 |
| 4,032,829 | A * | 6/1977 | Schenavar | 322/3 |
| 4,090,413 | A * | 5/1978 | Vickland | 74/665 GB |
| 4,387,781 | A * | 6/1983 | Ezell et al. | 180/65.22 |
| 5,347,186 | A * | 9/1994 | Konotchick | 310/17 |
| 5,775,469 | A * | 7/1998 | Kang | 188/267 |
| 6,914,351 | B2 * | 7/2005 | Chertok | 310/12.26 |
| 6,952,060 | B2 * | 10/2005 | Goldner et al. | 310/12.13 |
| 8,446,022 | B2 * | 5/2013 | Jiang et al. | 290/1 R |
| 2006/0096815 | A1 * | 5/2006 | Kondo et al. | 188/266.5 |

FOREIGN PATENT DOCUMENTS

| | | | |
|---|---|---|---|
| JP | 62087675 A | * | 4/1987 |
| JP | 01089947 A | * | 4/1989 |
| JP | 5-131832 | | 5/1993 |
| JP | 2004-215375 | | 7/2004 |
| JP | 2006-161881 | | 6/2006 |
| JP | 2008-222112 | | 9/2008 |

* cited by examiner

ELECTRICITY GENERATING SHOCK ABSORBERS

PRIORITY CLAIM

The present disclosure claims benefit of U.S. Provisional Patent Application No. 61/368,846, filed on Jul. 29, 2010, for "ELECTRICITY GENERATING SHOCK ABSORBERS," the entire contents and disclosure of which, are expressly incorporated by reference herein as if fully set forth herein.

TECHNICAL FIELD

The present disclosure is generally related to energy recovery. Specifically, the present disclosure is related to regenerative suspension systems.

BACKGROUND

Among all the sources of pollutants in the atmosphere, the transportation industry generally is a significant contributor. For example, in the United States, the transportation industry consumes a majority of the crude oil, much of which is used by automobiles. Hence, any advances in energy efficiency, especially in the transportation industry, may correspondingly lead to reduction in energy consumption, which not only cumulatively decreases energy costs, but also cumulatively contributes to a greener environment and greater energy independence and security.

Increasing demand for better fuel economy has led to improvements and developments in hybrid vehicles, electric vehicles and vehicles powered by fuel cells or diesel fuel. Efforts on the part of the automotive industry to increase fuel economy have included, but are not limited to, reductions in vehicle mass, improved aerodynamics, active fuel management, direct injection engines, homogeneous charge compression ignition engines and hybrid engines. Still, other mechanisms, techniques and energy sources that will improve fuel economy are continually being sought.

Currently, about 10 to 16% of the available fuel energy is used to drive an automobile, overcoming the friction and drag force from the road and wind. Besides engine cycle efficiency, one important mechanism of energy loss in automobiles is the dissipation of kinetic energy during vehicle vibration and motion. In the past hundred years, the automotive industry has been working hard to dissipate the motion and vibration energy into waste heat by optimal design of braking and suspension systems and by employing active controls, such as anti-lock braking systems or active suspensions. During the past ten years, energy recovery from braking has achieved great commercial success in hybrid vehicles. However, regenerative vehicle suspensions, which have the advantage of continuous energy recovery, have generally not come into practice due to various factors, such as insufficient vibration control, unsatisfactory energy harvesting, prohibitive costs, high complexity, practical incompatibility and relative inefficiency.

In view of the foregoing, it would be desirable to provide a regenerative vehicle suspension technology that takes into account the aforementioned factors.

BRIEF SUMMARY

An exemplary embodiment of the disclosed technology is directed to an electricity generating shock absorber comprising: a coil assembly having a length of electrically conducting material wrapped around an outside perimeter, and along a length, of a hollow tube formed of electrically resistant material; a magnet unit formed of at least one annular axial magnet; a central shaft having a magnetic reluctance on which a plurality of the magnet units are mounted, the central shaft dimensioned for insertion through a central opening of the at least one annular axial magnet, the central shaft combined with the plurality of magnet units forming a magnet assembly dimensioned to slideably insert into a central cavity of the hollow tube; and a cylindrical shell having a first end attached to a terminal end of the magnet assembly, the cylindrical shell extending a length of the magnet assembly, the cylindrical shell having an inner diameter sized to slideably accommodate an outside diameter of the coil assembly.

An exemplary embodiment of the disclosed technology is directed to a method of manufacturing an electricity generating shock absorber, the method comprising: at least once, winding a coil around a hollow tube having an electrical resistance; stacking a first pair of permanent magnets on a shaft having a magnetic reluctance; adapting the stacked shaft to be moveable in relation to a hollow cavity of the hollow tube; attaching the shaft to a first base; separating the first pair of magnets between each other on the shaft by a first magnetically-permeable spacer; aligning the first pair of magnets with like-poles facing each other; and encapsulating at least a part of the wound coil via a concentric outer cylinder attached at one end to the first base.

An exemplary embodiment of the disclosed technology is directed to a method of using an electricity generating shock absorber for generating electricity, the method comprising: moving a magnet assembly in relation to a coil assembly, the coil assembly comprising: a coil at least once wound around a hollow tube having an electrical resistance and a hollow cavity, the magnet assembly comprising: a first pair of permanent magnets stacked on a shaft having a magnetic reluctance, the shaft attached to a first base, the first pair of magnets separated between each other on the shaft by a first magnetically-permeable spacer, the first pair of magnets aligned with like-poles facing each other; and a concentric outer cylinder encapsulating at least a part of the coil assembly, the cylinder attached at one end to the first base.

An exemplary embodiment of the disclosed technology is directed to electricity generating shock absorber comprising: a first case comprising: a rack attached to the inner surface of the first case; and a second case comprising: a pinion in contact with the rack and attached to the inner surface of the second case via a first shaft mounted on a first base, a bevel gear box comprising a first and second bevel gear in contact with each other, the first bevel gear mounted on the first shaft, the second gear mounted on a second shaft coupled via a coupler to a rotational motor attached to the inner surface of the second case.

An exemplary embodiment of the present invention is directed to a method for generating electricity from mechanical vibrations, the method comprising: providing an electricity generating shock absorber having a magnet assembly including a first pair of magnets stacked horizontally along a shaft constructed of magnetic reluctant material and a coil assembly including a coil wound around a hollow tube having an electrical resistance, the first pair of magnets aligned with like-poles facing each other, the first pair of magnets, an insertion end of the magnet assembly being slidably inserted into an open end of the hollow tube of the coil assembly, a concentric outer cylinder encapsulating at least a part of the coil assembly, the cylinder attached at a base end of the magnet assembly opposite the insertion end; coupling a closed end of the hollow tube to a first mass; coupling the base end of the magnet assembly to a second mass, the electricity generating shock absorber providing vibration dampening between the first mass and the second mass; inducing relative motion between the magnet assembly and the coil assembly to generate electromotive voltage in the coil; and capturing the electromotive voltage.

BRIEF DESCRIPTION OF THE DRAWINGS

The objects, features and advantages of the disclosed technology will become apparent to a skilled artisan in view of the following detailed description taken in combination with the attached drawings, in which.

DETAILED DESCRIPTION OF THE PREFERRED EMBODIMENTS

As used herein, a vehicle is a device that is designed or used to transport people or cargo. Vehicles may be land-based, such as automobiles, buses, trucks, trains, or marine-based, such as ships, boats, or aeronautical, such as airplane, helicopter, spacecraft.

As used herein, a shock absorber is an energy dissipating device generally used in parallel with the suspension spring to reduce the vibration generated by surface irregularities or during acceleration and braking.

While, for simplicity and clarity, the following description of the figures is described in reference to land-based vehicles, the disclosed technology is not limited to land-based vehicles. Rather, the disclosed technology may be implemented and used with any device that is designed or used to transport people or cargo.

Figures 1A, 1B:
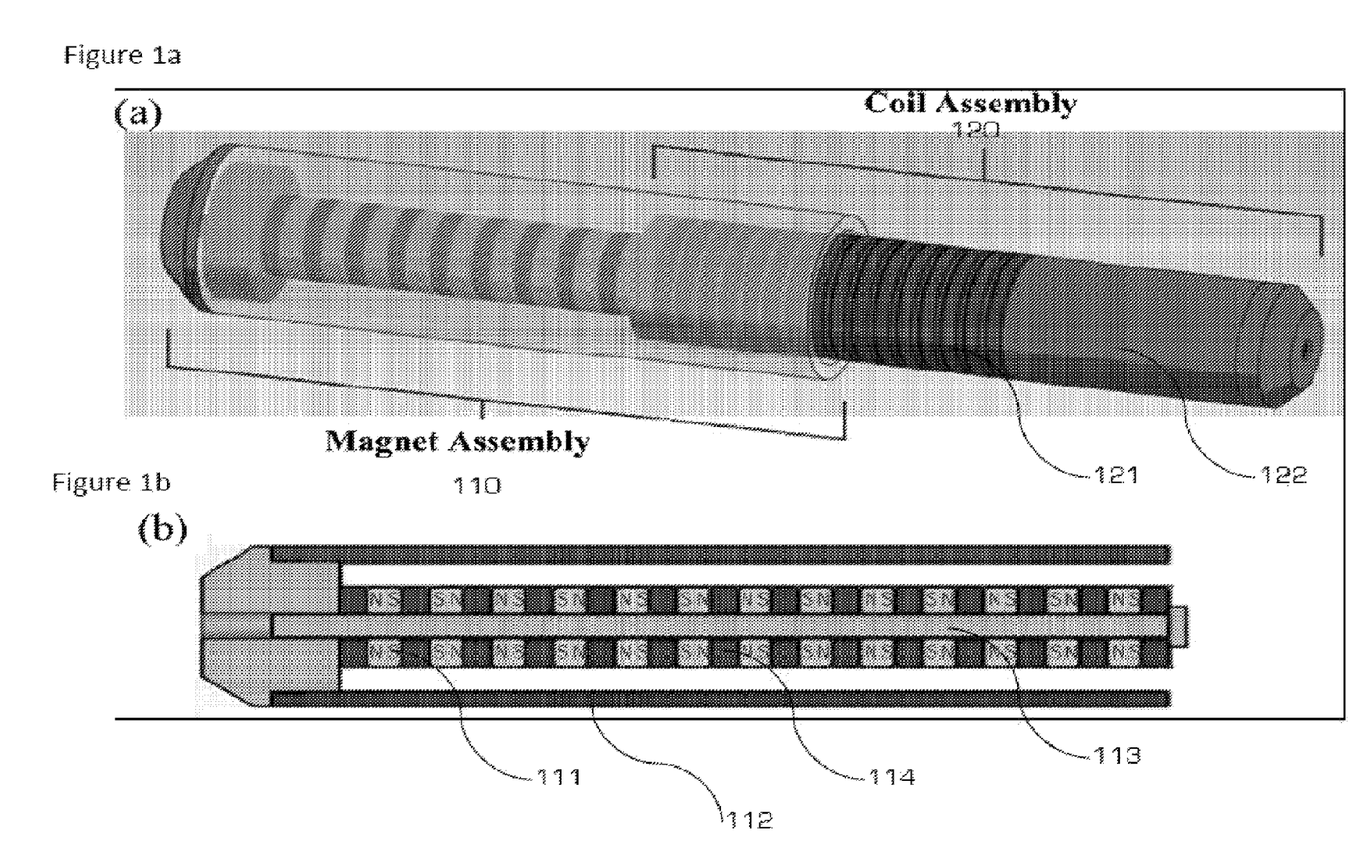
FIG. 1a symbolically illustrates an exemplary embodiment of a linear electromagnetic shock absorber.
FIG. 1b symbolically illustrates a cross-section view of an exemplary embodiment of a magnet assembly.

FIG. 1a symbolically illustrates an exemplary embodiment of a linear electromagnetic shock absorber and FIG. 1b symbolically illustrates a cross section view of an exemplary embodiment of a magnet assembly.

As shown in FIG. 1a, a regenerative shock absorber 100 is in a configuration of a linear induction generator. In an exemplary embodiment, shock absorber 100 includes a magnet assembly 110 moveable in relation to a coil assembly 120. In an exemplary embodiment, shock absorber 100 includes a coil assembly 120 movable in relation to a magnet assembly 110. In an exemplary embodiment, magnet assembly 110 and coil assembly 120 are both movable in relation to each other.

In an exemplary embodiment, shock absorber 100 works in two cycles—a compression cycle and an extension cycle. In an exemplary automotive implementation where coil assembly 120 is attached to an automobile's frame and magnet assembly 110 is attached to the automobile's suspension system, the compression cycle occurs as coil assembly 120 moves downward and the extension cycle occurs as magnet assembly 110 moves upward (the relative movement of the coil and magnet assemblies 110 and 120 may be different upon a different configuration). Thus, if the compression cycle controls the motion of the vehicle's unsprung weight, then extension controls the motion of the heavier, sprung weight. Consequently, via alternation of cycles, due to, for example, road irregularities or during acceleration and braking, shock absorber 100 converts a kinetic energy of suspension vibration between an automobile wheel and a sprung mass into useful electrical power, as further described below.

In an exemplary embodiment, magnet assembly 110 is composed of ring-shaped, i.e. annular, permanent magnets 111 separated by ring-shaped high magnetically permeable spacers 114 stacked on a shaft 113 of high reluctance material. In an exemplary embodiment, the material is aluminum. In an exemplary embodiment, magnets 111 are rare-earth permanent magnets. In an exemplary embodiment, spacers 114 are steel spacers. In an exemplary embodiment, magnet assembly includes 12 magnets 111 and 13 spacers 114.

As illustrated in FIG. 1b, magnets 111 are arranged with like-poles of adjacent magnets 111 facing each other to redirect a magnetic flux in a radial direction. A concentric outer cylinder 112 made of high magnetically permeable material is used to protect the coils and reduce the reluctance of magnetic loops, to further increase magnetic flux density in the coils i.e. in order to further "pull" the magnetic flux outward.

Coil assembly 120 is composed of coils 121 wound around a tube 122 having a high electrical resistance. In an exemplary embodiment, coils 121 are composed of copper and tube 122 is composed of polyoxymethylene. In an exemplary embodiment, the height of one coil is equal to half of the total height of magnet 111 and spacer 114. In an exemplary embodiment, coils 121 align with magnet assembly 110. In an exemplary embodiment, the total number of coils 121 is 16. In an exemplary embodiment, coils 121 are connected to a rectifier set-up.

In an exemplary embodiment, power generated in shock absorber 100 is related to the total volume of coils 121. However, voltage is related with the winding of coils 121 around tube 122. In an exemplary embodiment where the total volume of coils 121 is constant and coils 121 with a small diameter are used, then more windings of coils 121 are expected, thus generating a higher voltage. In an exemplary embodiment, coils 121 are wound in a range between 250 and 300 turns, which generates about 10V of output voltage.

In an exemplary embodiment, all the coils together will form a four-phase design where the 0 degree and 180 degree phases generate maximum positive and negative voltages and the 90 degree and 270 degree phases have zero voltage. Although the voltage or power of each phase may depend on the relative position of coil assembly 120 in the magnetic field, the total power generation does not. As coils 121 vibrate in relation to the magnetic field created by magnet assembly 110, an electromotive force is generated, thus producing electricity. Also, the electromotive force serves as a damping force to reduce the vehicle vibration. In an exemplary embodiment, shock absorber 100 maintains a constant performance of power generation for movement (compression and extension cycles) between about 2 to about 4 inches.

For example, when shock absorber 100 is placed in an automobile suspension system, vibrations in the suspension system, due to road irregularities or during acceleration and braking, cause the coil assembly 120 to move in relation to the magnetic assembly 110 i.e. compression and extension cycles, thus generating an electromotive force, which can then be used to recharge the automobile's battery. In an exemplary embodiment, the peak output voltage is inversely proportional to the square of coils 121 diameter and the peak power depends on the total volume of conducting material in the coils.

Figure 2:
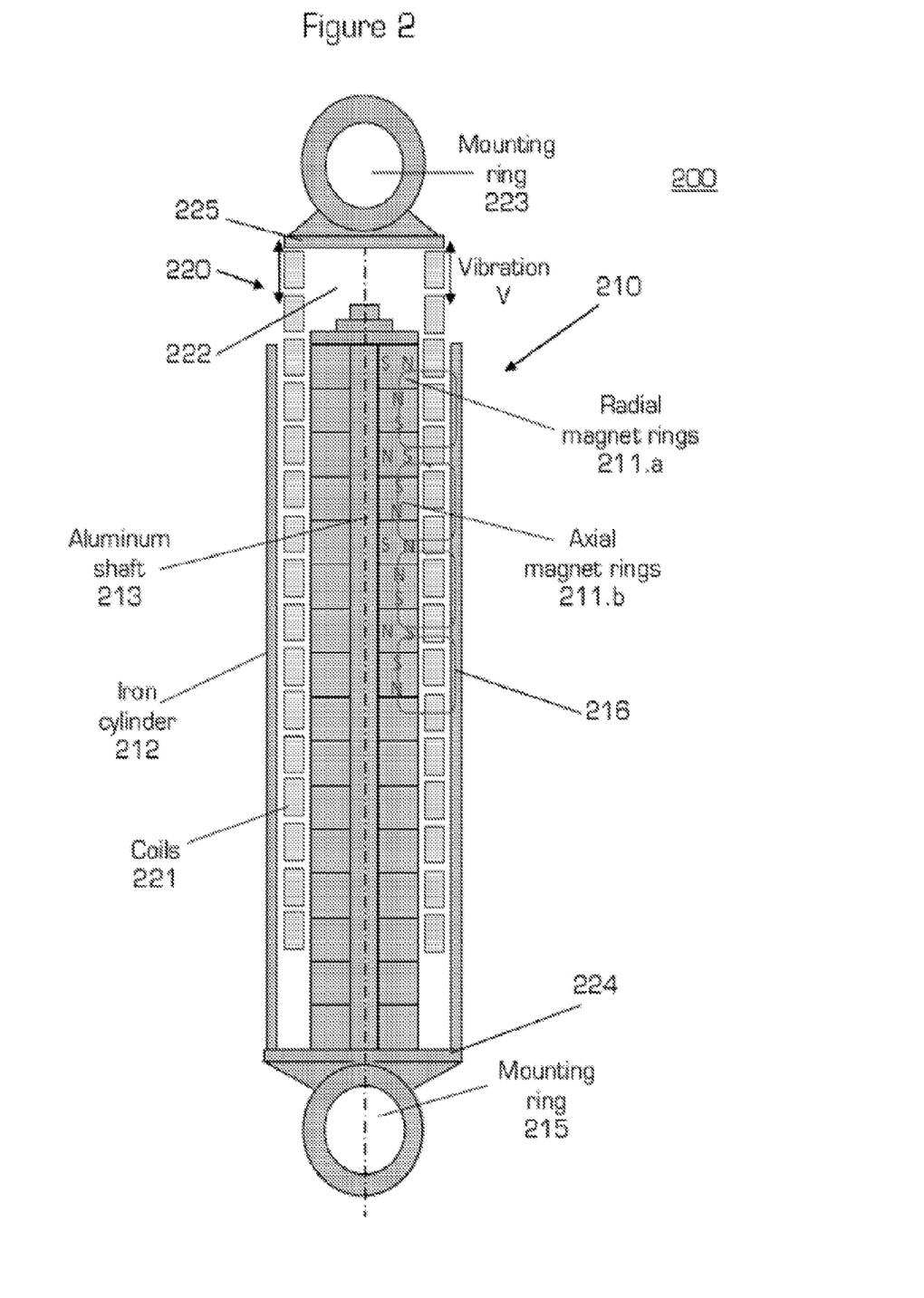
FIG. 2 symbolically illustrates an exemplary embodiment of a single layer electricity generating shock absorber with radial magnets.

FIG. 2 symbolically illustrates an exemplary embodiment of a single layer electricity generating shock absorber, where radial magnets are used to increase the magnetic flux density.

In an exemplary automotive implementation, shock absorber 200 converts a kinetic energy of suspension vibration between a wheel and a sprung mass into useful electrical power. In an exemplary embodiment, shock absorber 200 includes a magnet assembly 210 movable in relation to a coil assembly 220 in direction V. In an exemplary embodiment, shock absorber 200 includes a coil assembly 220 movable in relation a magnet assembly 210 in direction V. In an exemplary embodiment, magnet assembly 210 and coil assembly 220 are both movable in relation to each other.

In an exemplary embodiment, magnet assembly 210 is composed of radial magnets 211.a and axial magnets 211.b stacked on a shaft 213 of high reluctance material. In an exemplary embodiment, the material is aluminum. In an exemplary embodiment, the magnets are rare-earth permanent magnets. In an exemplary embodiment, shaft 213 is attached to a first base 224. In an exemplary embodiment, a first mounting ring 215 is attached to first base 224. In an exemplary embodiment, mounting ring 215 connects to an axle, near an automotive wheel, i.e., the unsprung weight.

As further exemplarily illustrated in FIG. 2, radial magnets 211.a and axial magnets 211.b are arranged with like-poles of adjacent magnets 211.a and 211.b facing each other to redirect a magnetic flux in clockwise and counter-clockwise directions 216. In an exemplary embodiment, a concentric outer cylinder 212 made of high magnetically permeable material is used to protect the coils and reduce the reluctance of magnetic loops, to further increase magnetic flux density in the coils i.e. in order to further "pull" the magnetic flux outward.

Coil assembly 220 is composed of coils 221 wound around a tube 222 having a high electrical resistance. In an exemplary embodiment, coils 221 are composed of copper and tube 222 is composed of polyoxymethylene. In an exemplary embodiment, tube 222 is connected to a second base 225. In an exemplary embodiment, a second mounting ring 223 is attached to second base 225. In an exemplary embodiment, second mounting ring 223 connects to an automobile frame, i.e., the sprung weight. In an exemplary embodiment, coils 221 are connected to a rectifier set-up.

For example, when shock absorber 200 is placed in an automobile suspension system, vibrations in the suspension system, due to road irregularities or during acceleration and braking, cause the coil assembly 220 to move in relation to the magnetic assembly 210 i.e. compression and extension cycles, thus generating an electromotive force, which can then be used to recharge the automobile's battery. In an exemplary embodiment, the relative motion generates alternating current ("AC"). The generated AC passes through a rectifier and via a rectification process gets converted to direct current ("DC"). Subsequently, a power converter, such as a DC to DC converter, is used to maintain a suitable voltage for charging a typical automobile battery. In an exemplary embodiment, shock absorber 200 harvests between about 2 to about 8 W of energy at 0.25-0.5 m/s RMS suspension velocity, which charges a typical car battery in about 7.5 hours.

Figure 3:
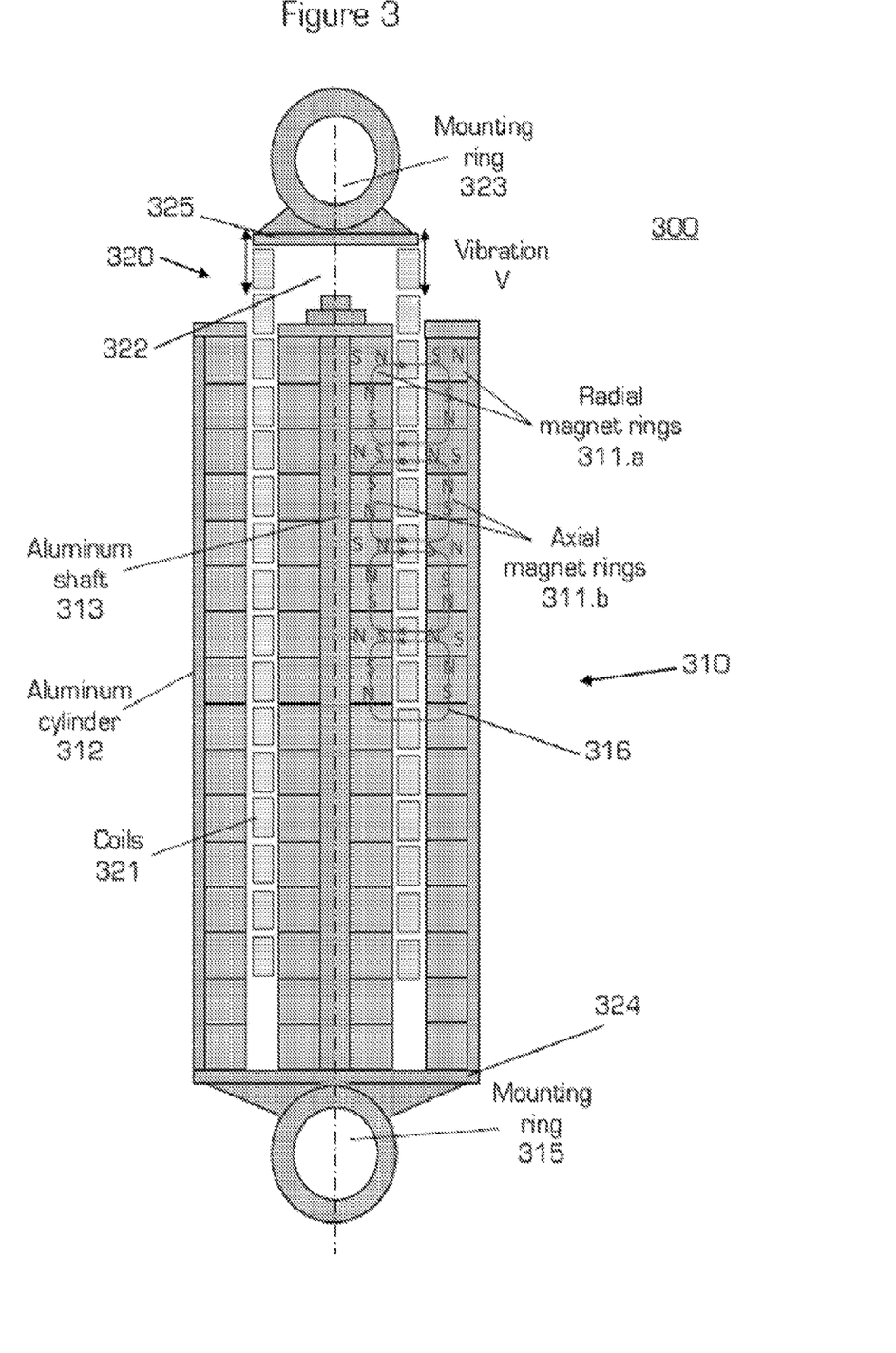
FIG. 3 symbolically illustrates an exemplary embodiment of a double layer electricity generating shock absorber.

FIG. 3 symbolically illustrates an exemplary embodiment of a double layer electricity generating shock absorber.

In an exemplary automotive implementation of the disclosed technology, shock absorber 300 converts a kinetic energy of suspension vibration between a wheel and a sprung mass into useful electrical power. In an exemplary embodiment, shock absorber 300 includes a magnet assembly 310 moveable in relation to a coil assembly 320 in direction V. In an exemplary embodiment, shock absorber 300 includes a coil assembly 320 movable in relation to a magnet assembly 310 in direction V. In an exemplary embodiment, magnet assembly 310 and coil assembly 320 are both movable in relation to each other.

In an exemplary embodiment, magnet assembly 310 is composed of double layers (inner and outer) of radial magnets 311.a and axial magnets 311.b stacked on a shaft 313 of high reluctance material. In an exemplary embodiment, the material is aluminum. In an exemplary embodiment, the magnets are rare-earth permanent magnets. In an exemplary embodiment, shaft 313 is attached to a first base 324. In an exemplary embodiment, a first mounting ring 315 is attached to first base 324. In an exemplary embodiment, mounting ring 315 connects to an axle, near an automotive wheel, i.e., the unsprung weight.

Double layers of radial magnets 311.a and axial magnets 311.b are arranged with like-poles of adjacent magnets 311.a and 311.b facing each other to redirect a magnetic flux in clockwise and counter-clockwise directions 316. In an exemplary embodiment, as coils 321 vibrate in relation to and between double layers of radial magnets 311.a and axial magnets 311.b, a magnetic flux, which has increased power density over an exemplary embodiment described in FIGS. 2a and 2b, is generated. In an exemplary embodiment, a concentric outer cylinder 312 made of high magnetically permeable material is used to protect the coils and reduce the reluctance of magnetic loops, to further increase magnetic flux density in the coils i.e. in order to further "pull" the magnetic flux outward.

Coil assembly 320 is composed of coils 321 wound around a tube 322 having a high electrical resistance. In an exemplary embodiment, coils 321 are composed of copper and tube 322 is composed of polyoxymethylene. In an exemplary embodiment, the polyoxymethylene tube is connected to a second base 325. In an exemplary embodiment, a second mounting ring 323 is attached to second base 325. In an exemplary embodiment, second mounting ring 323 connects to an automobile frame, i.e., the sprung weight. In an exemplary embodiment, coils 321 are connected to a rectifier set-up.

For example, when shock absorber 300 is placed in an automobile suspension system, vibrations in the suspension system, due to road irregularities or during acceleration and braking, cause the coil assembly 320 to move in relation to the magnetic assembly 310 i.e. compression and extension cycles, thus generating an electromotive force, which can then be used to recharge the automobile's battery.

Figure 5:
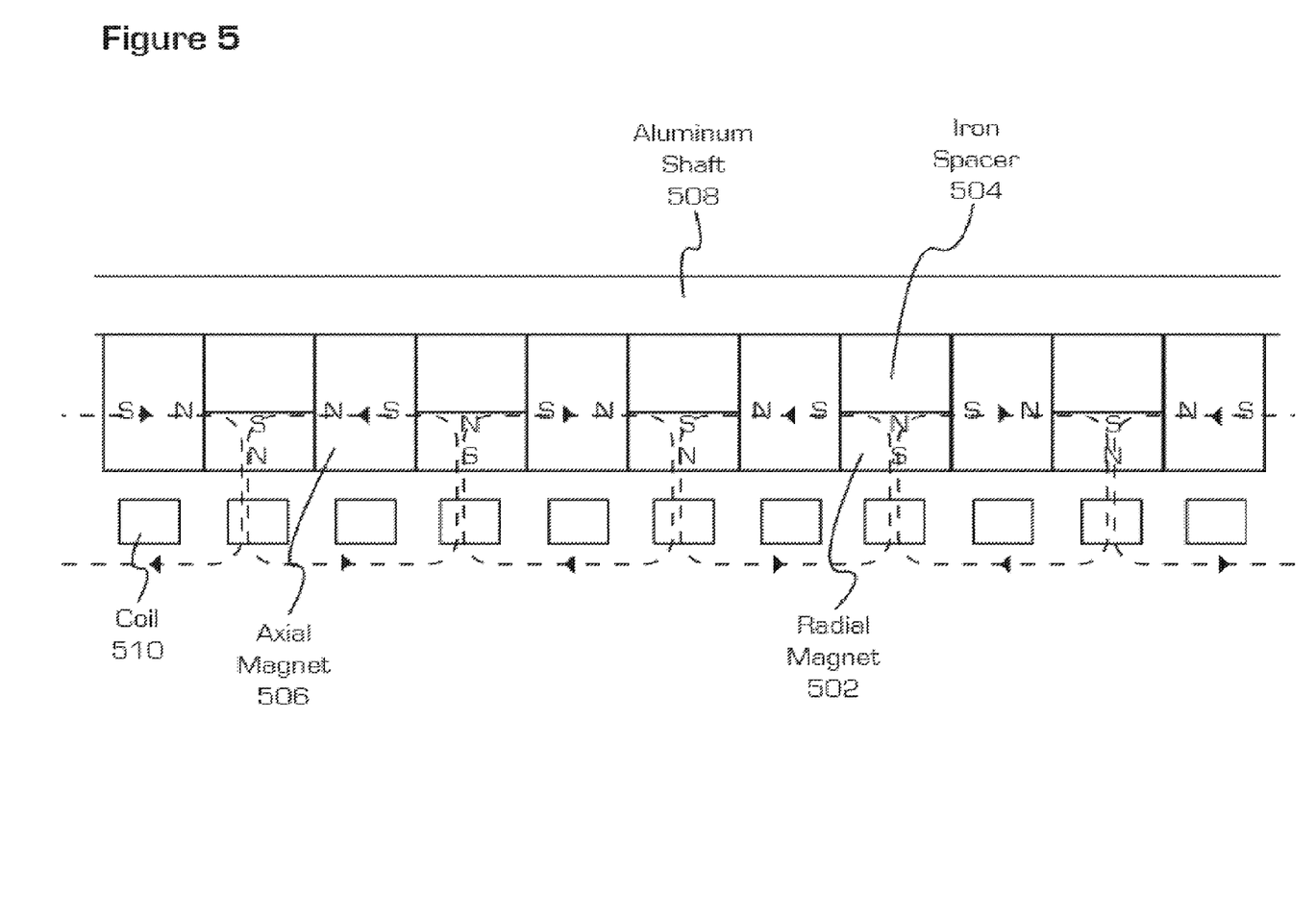
FIG. 5 symbolically illustrates an alternative arrangement of the magnets of the electromagnetic embodiments of the present invention.

Alternatively, the arrangement of radial and axial magnets, shown in FIGS. 2a, 2b and 3, are arranged as shown in FIG. 5. Specifically, radial rare-earth magnets 502 are dimensioned to be thinner than the radial magnets disclosed above with respect to FIGS. 2a, 2b and 3. Spacers 504, constructed of a material having high magnetic permeability such as iron, are stacked onto the radial rare-earth magnets 502 so that the stacked assembly of the radial rare-earth magnet 502 and the spacer 504 has the same height as adjacent axial magnets 506. In other words, the annular radial magnet 502 includes an inlayed spacer 504, having an annular shape. The cross-sectional aspect of the combination of radial magnet 502 and spacer 504 is identical to the cross-sectional aspect of the axial magnet 506 in that the central opening diameter and the outside diameter of the combined radial magnet 502 and spacer 504 is the same as the respective diameters of the axial magnet.

The radial rare-earth magnets 502, Axial magnets 506 and spacers 504 are positioned between an aluminum shaft 508 and linearly disposed coils 510 similar to the arrangement shown in FIGS. 2a and 2b. Moreover, in the double layer embodiment of FIG. 3, the radial rare-earth magnets in both layers can be replaced with the stacked assembly shown in FIG. 5.

The stacked assembly of the radial rare-earth magnet 502 and the spacer 504, shown in FIG. 5, advantageously similar or even higher magnetic density than a full height radial rare-earth magnet at a significantly reduced cost. The advantages are obtained because iron has a greater permeability than rare-earth materials, such as NdFeB, used for rare-earth permanent magnets. Moreover, iron is significantly less expensive than rare-earth permanent magnets. Thus, a cost savings can be realized by using smaller dimensioned radial rare-earth magnets 502 with the spacers 504 over using full height radial rare-earth magnets in the configurations shown in FIGS. 2a, 2b and 3.

Figure 4:
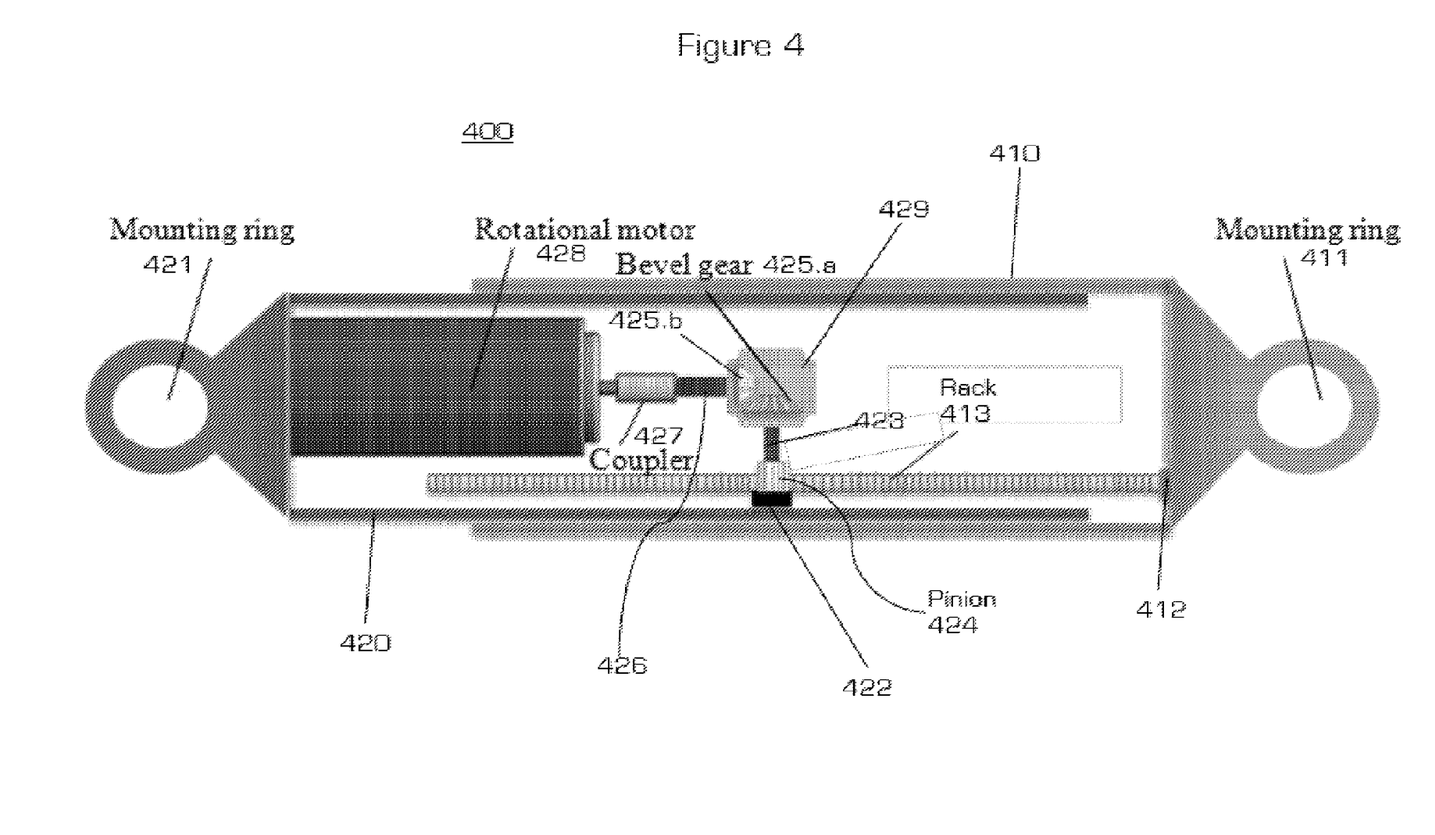
FIG. 4 symbolically illustrates an exemplary embodiment of a gear-based electricity generating shock absorber.

FIG. 4 symbolically illustrates an exemplary embodiment of a gear-based electricity generating shock absorber. Shock absorber 400 includes an outer case 410 and an inner case 410.

In an exemplary embodiment, outer case 410 includes a toothed rack 413 attached to inner surface of outer case 410 via a first base 412. A first mounting ring 411 is attached to an outer surface of outer case 410.

In an exemplary embodiment, inner case 420 includes a toothed pinion 424, which is mounted near a first end of a first shaft 423, engaging rack 413 for converting linear motion into rotational motion. Hence, since vehicle vibration is periodic linear motion, the vibration is converted into rotational motion via the movement of rack 413 up to the limit of its travel, against pinion 424, causing pinion 424 to rotate on its axis. First end of first shaft 423 is attached to a base 422 mounted on inner surface of inner case 420.

In an exemplary embodiment, a bevel gear 425.a engages a bevel gear 425.b within a bevel gearbox 429. Bevel gear 425.a is mounted on a second end of first shaft 423. Bevel gear 425.b is mounted on a second end of a second shaft 426 attached to a rotational motor 428. As bevel gear 425.a transfers rotational motion from rack 413 and pinion 424 to bevel gear 426.b, rotational motor 428 is driven via a rotation of second shaft 426 about its axis. A coupler 427 attaches motor 428 to second shaft 426. A second mounting ring 421 is attached to an outer surface of inner case 420.

In an exemplary embodiment, when rotational motor 428 is driven by rack 413 and pinion 424 via bevel gear 425.a and 425.b, rotational motor 428 generates a back electromotive force, thus producing electricity. While in the typical shock absorber, the electromotive force acts as the damping force as the vibration is mitigated by dissipating the vibration energy into heat, shock absorber 400 vibration is mitigated by dissipating the vibration energy into electric energy.

Exemplary embodiments of electricity generating shock absorbers maintain or enhance the required suspension damping performance and provide an effective way to adjust the suspension damping according to driver need or road conditions. Furthermore, the vibration mitigation performance is maintained or enhanced since the electricity-generating shock absorbers can provide back electromagnetic force, acting as the damping or control force. Also, exemplary embodiments of electricity generating shock absorbers enable energy harvesting in a typical passenger vehicle estimated to be on the same order of scale as a vehicle alternator as under normal driving conditions. Moreover, the generated power can be used to charge a battery, power the electrical accessories, such as lights or radio, or drive the wheels of a hybrid vehicle.

Further, exemplary embodiments of electricity generating shock absorbers enable an easy implementation of regenerative active suspension: a combination of energy harvesting and active suspension control. Additionally, exemplary embodiments of electricity generating shock absorbers are retrofittable, which means it can be used for new cars, or just to replace the traditional viscous shock absorber in the existing cars.

It should further be known that the present invention is not limited to application in motor vehicles. Rather, the electricity generating shock absorber can be advantageously utilized in any application where sufficient vibrational forces are present to operate the shock absorbers. In all embodiments, the electricity generating shock absorbers of the present invention are intended to be properly sized to accommodate the loads and forces experienced by the electricity generating shock absorbers in the particular application. Thus, any specific values provided in the disclosure above, are intended for illustrative convenience only and should not be taken as the full range of values acceptable for implementing the present invention.

In contrast to other regenerative shock absorbers, exemplary embodiments of electricity generating shock absorbers have high energy density, low weight and good compactness. Unlike ball-screw based systems, exemplary embodiments of electricity generating shock absorber also have little interference with vehicle dynamics.

What is claimed is:

1. An electricity generating shock absorber comprising:
    a coil assembly having a length of electrically conducting material wrapped around an outside perimeter of the coil assembly, and along a length, of a hollow tube formed of electrically resistant material;
    a magnet unit formed of at least one annular axial magnet;
    a central shaft having a predetermined magnetic reluctance on which a plurality of the magnet units are mounted, the central shaft dimensioned for insertion through a central opening of the at least one annular axial magnet, the central shaft combined with the plurality of magnet units forming a magnet assembly dimensioned to slideably insert into a central cavity of the hollow tube; and
    a cylindrical shell having a first end attached to a terminal end of the magnet assembly, the cylindrical shell extending a length of the magnet assembly, the cylindrical shell having an inner diameter sized to slideably accommodate an outside diameter of the coil assembly,
    wherein the magnet unit comprises an annular radial magnet and the at least one annular axial magnet,
    wherein adjacent magnet units disposed on the central shaft are disposed with a reflected orientation with respect to each other, and
    wherein the radial magnet comprises an inlayed annular spacer formed of a material having a high magnetic permeability, the inlayed annular spacer material being different than the radial magnet.

2. The electricity generating shock absorber of claim 1, wherein adjacent magnet units disposed on the central shaft are oriented with like poles facing each other, adjacent magnet units being separated by an annular spacer formed of a material having a high magnetic permeability.

3. The electricity generating shock absorber of claim 1, wherein the shaft is at least partially composed of aluminum, the coil is wound around the hollow tube less than 301 times and at least partially composed of copper and the tube is at least partially composed of polyoxymethylene.

4. The electricity generating shock absorber of claim 1, wherein the electrically conducting material of the coil assembly is operably connected to a rectifier.

5. The electricity generating shock absorber of claim 4, wherein the rectifier is operably connected to an energy storage device.

6. The electricity generating shock absorber of claim 1, wherein the cylindrical shell is at least partially composed of a magnetically-permeable material.

7. The electricity generating shock absorber of claim 1, wherein an outer surface of the cylindrical shell is at least partially composed of magnetically-permeable material and an inner surface of the cylinder having a second plurality of annular magnet units aligned with like-poles.

8. The electricity generating shock absorber of claim 1, wherein the terminal end of the magnet assembly is securely attached to a first mounting ring connectable to a vehicle axle.

9. The electricity generating shock absorber of claim 8, wherein the hollow tube includes a second mounting ring securely attached to a terminal end of the hollow tube opposite the magnet assembly insertion end, the second mounting ring being connectable to a vehicle frame.

10. The electricity generating shock absorber of claim 1, wherein electromotive voltage is generated as the magnet assembly is moved in relation to the coil assembly during a compression and extension cycles, the electromotive voltage serving as a damping force to reduce vibration.

11. A method of manufacturing an electricity generating shock absorber, the method comprising:
   winding a coil at least once around a hollow tube having an electrical resistance;
   stacking a first pair of permanent magnets on a shaft having a magnetic reluctance;
   adapting the stacked shaft to be moveable in relation to a hollow cavity of the hollow tube;
   attaching the shaft to a first base;
   separating the first pair of magnets between each other on the shaft by a first magnetically-permeable spacer;
   aligning the first pair of magnets with like-poles facing each other; and
   encapsulating at least a part of the wound coil via a concentric outer cylinder attached at one end to the first base,
   further comprising connecting the coil to a rectifier, wherein the first pair of magnets comprises a radial magnet and an axial magnet and the cylinder is at least partially composed of a magnetically-permeable material and the first pair of magnets and the first spacer are ring-shaped; and
   wherein the first spacer is formed of a material having a high magnetic permeability, the inlayed annular spacer material being different than the radial magnet.

12. The method of claim 11, wherein the shaft is at least partially composed of aluminum, the coil is wound around the hollow tube less than 301 times, the coil is at least partially composed of copper and the tube is at least partially composed of polyoxymethylene.

13. The method of claim 11, wherein an outer surface of the cylinder is at least partially composed of magnetically-permeable material, an inner surface of the cylinder comprises a second pair of ring-shaped permanent magnets aligned with like-poles facing each other to redirect a magnetic flux in a clockwise and a counter-clockwise directions, the second pair of magnets separated between each other by a second ring-shaped magnetically-permeably spacer, the second pair further comprising a radial magnet and an axial magnet and the wound coil movable in relation to and between the first and the second pairs of magnets.

14. The method of claim 11, further comprising attaching the first base to a first mounting ring connectable to a vehicle axle, wherein the tube includes a second base at one end of the tube and a second mounting ring securely attached to the second base, the second mounting ring connectable to a vehicle frame.

15. A method for generating electricity from mechanical vibrations, the method comprising:
   providing an electricity generating shock absorber having a magnet assembly including a first pair of magnets stacked horizontally along a shaft constructed of magnetic reluctant material and a coil assembly including a coil wound around a hollow tube having an electrical resistance, the first pair of magnets aligned with like-poles facing each other, the first pair of magnets, an insertion end of the magnet assembly being slidably inserted into an open end of the hollow tube of the coil assembly, a concentric outer cylinder encapsulating at least a part of the coil assembly, the cylinder attached at a base end of the magnet assembly opposite the insertion end;
   coupling a closed end of the hollow tube to a first mass;
   coupling the base end of the magnet assembly to a second mass, the electricity generating shock absorber providing vibration dampening between the first mass and the second mass;
   inducing relative motion between the magnet assembly and the coil assembly to generate electromotive voltage in the coil; and
   capturing the electromotive voltage,
   wherein the coil is operably connected to a rectifier, the first pair of magnets comprises a radial magnet and an axial magnet and the cylinder is at least partially composed of magnetically-permeable material and the first pair of magnets and the first spacer are annular; and
   wherein the radial magnet includes an inlayed annular spacer formed of a material having a high magnetic permeability, the inlayed annular spacer material being different than the radial magnet, the radial magnet and the inlayed annular spacer have combined dimensions equivalent to respective dimensions of the axial magnet.

16. The method of claim 15, wherein the shaft is at least partially composed of aluminum, the coil is wound around the hollow tube less than 301 times, the coil is at least partially composed of copper and the tube is at least partially composed of polyoxymethylene.

17. The method of claim 15, wherein an outer surface of the cylinder is at least partially composed of magnetically-permeable material, an inner surface of the cylinder comprises a second pair of ring-shaped permanent magnets aligned with like-poles facing each other to redirect a magnetic flux in a clockwise and a counter-clockwise directions, the second pair of magnets separated between each other by a second ring-shaped magnetically-permeably spacer, the second pair of magnets further comprising a radial magnet and an axial magnet and the wound coil movable in relation to and between the first and the second pairs of magnets.

18. The method of claim 15, wherein the base end is securely attached to a first mounting ring connectable to a vehicle axle, and the closed end of the hollow tube is securely attached to a second mounting ring connectable to a vehicle frame, electromotive voltage, serving as a damping force to reduce a vehicle vibration, is generated during compression and extension cycles of the electricity generating shock absorber.

19. An electricity generating shock absorber comprising:
   a first case comprising:
      a rack attached to the inner surface of the first case; and
   a second case comprising:

a pinion in contact with the rack and attached to the inner surface of the second case via a first shaft mounted on a first base, a bevel gear box comprising a first and second bevel gear in contact with each other, the first bevel gear mounted on the first shaft, the second gear mounted on a second shaft coupled via a coupler to a rotational motor attached to the inner surface of the second case.

20. The electricity generating shock absorber of claim 19, further comprising a first mounting ring attached to an outer surface of the first case and a second mounting ring attached to an outer surface of the second case, wherein the rack is attached to the inner surface of the first case via a first base.

21. The electricity generating shock absorber of claim 19, wherein the rotational motor is operably connected to a rectifier.

22. The electricity generating shock absorber of claim 21, wherein the rectifier is operably connected to an energy storage device.

* * * * *